United States Patent

[11] 3,576,385

[72] Inventor Philip W. Robinson
      7831 Seventh St., Downey, Calif. 90241
[21] Appl. No. 841,228
[22] Filed July 14, 1969
[45] Patented Apr. 27, 1971

[54] ELECTRODE FOR A GLASS FURNACE
     8 Claims, 3 Drawing Figs.

[52] U.S. Cl. ................................................. 13/6
[51] Int. Cl. ................................................. C03b 5/02
[50] Field of Search ................................... 13/6, 18;
                                                     219/120

[56] References Cited
     UNITED STATES PATENTS
     2,513,323  7/1950  Hensel et al. ............... 219/120
     2,693,498  11/1954  Penberthy ................... 13/6X
     3,179,732  4/1965  Touvay ........................ 13/6
     3,487,193  12/1969  Width ......................... 219/120

Primary Examiner—Bernard A. Gilheany
Assistant Examiner—Roy N. Envall, Jr.
Attorney—Donald Diamond ABSTRACT: A water-cooled electrode is designed especially for a glass furnace. The electrode is a tubular sleeve in which is slidably held a sectionalized core. The electrode can be added to as required since the electrode is slowly consumed by dissolving in the molten glass. The water-cooled feature adds to the life of the electrode and also greatly reduces the rapid deterioration of the furnace wall in the vicinity of the electrode by reducing wall temperatures in that area.

PATENTED APR 27 1971

3,576,385

PHILIP W. ROBINSON
*INVENTOR.*

BY
*Knight & Rodgers*
ATTORNEYS

ELECTRODE FOR A GLASS FURNACE

BACKGROUND OF THE INVENTION

The present invention relates generally to furnaces for melting glass, and more particularly to the construction of an electrode for mounting in the wall of a furnace for heating glass to a molten condition or to add heat to already molten glass.

The problem encountered may be briefly stated as the undesirably short life of the electrode and the furnace sidewalls in the vicinity of the electrode, this short life being a result of the high temperatures encountered and the ability of the glass to dissolve many substances when molten. Typically, the glass temperature is around 2,600° F., while the temperature of the electrode is even higher, for example in the neighborhood of 2,800° F., more or less.

In the liquid state, the glass becomes a solvent for many substances and as a consequence it slowly dissolves the electrode projecting into the molten glass and also dissolves the electrode projecting into the molten glass and also dissolves the furnace sidewalls, especially in the vicinity of the electrode where the greatest heat is generated. Because of the loss of electrode into the glass, the electrode slowly shortens and is renewed by sliding it through the furnace wall to extend it into the body of molten glass.

At these high temperatures, not only is the molten glass electrically conductive but so also is the refractory wall. The wall is, of course, not at a uniform temperature but is hottest adjacent an electrode where it also becomes electrically conductive to the greatest degree.

The ability of the glass to dissolve slowly the refractory material of the wall, combined with the great heat and conductive character encountered, causes deterioration of the furnace wall. This deterioration is greatest at the location of the highest temperatures, which is in the vicinity of the electrode where it passes through the furnace wall. In addition to loss of wall material by solution into the glass, cracking of the wall often occurs as a result of the thermally induced stresses in the wall. Cracks of this character can raise serious problems as a result of leakage of glass from the furnace. At these high temperatures the sidewall material becomes electrically conductive causing more heat to be generated in the wall adjacent the electrodes.

Furnaces for melting glass are very expensive, largely because of the materials that must be used. For example, a furnace may cost $100,000 and upwardly to several times that amount. The refractory material used in the walls as well as the metals in the electrodes are chosen to obtain maximum life since this is more economical in the long run than to use cheaper materials. Thus it becomes evident that it is economically desirable to do everything possible to extend the life of a furnace.

Accordingly, it is a general object of the present invention to extend the useful life of the components of a furnace, and particularly of the electrodes and sidewall refractories, associated with the furnace for melting glass.

More particularly, it is an object of the present invention to provide an electrode of novel construction having a longer life than electrodes of known types.

It is also an object of the present invention to provide means for cooling the wall of the furnace in the zone of maximum temperatures surrounding an electrode passing through the wall.

SUMMARY OF THE INVENTION

These and other objects and advantages of the present invention have been achieved by providing in a furnace for melting glass an electrode comprising an outer sleeve having an internal bore extending for the full length of the sleeve, and a core slidably mounted in the bore, but filling a portion of the bore at one end of the electrode. The core is preferably in a plurality of short pieces which can be inserted and moved forward to the end of the electrode immersed in the glass, as required. Means are provided for circulating coolant within the section of the bore behind the core, that is that portion of the bore in the electrode which is not filled by the core pieces. The portion of the electrode containing coolant extends beyond the furnace wall into the body of molten glass for the purpose of cooling not only the electrode but also some of the glass and the wall in the vicinity of the electrode. Means are included tor detachably connecting an electrical conductor to the electrode.

BRIEF DESCRIPTION OF THE DRAWING

How the above objects and advantages of the present invention, as well as others not specifically mentioned, are attained will be more readily understood by reference to the following description and to the annexed drawing, in which.

DESCRIPTION OF A PREFERRED EMBODIMENT

Figure 1:
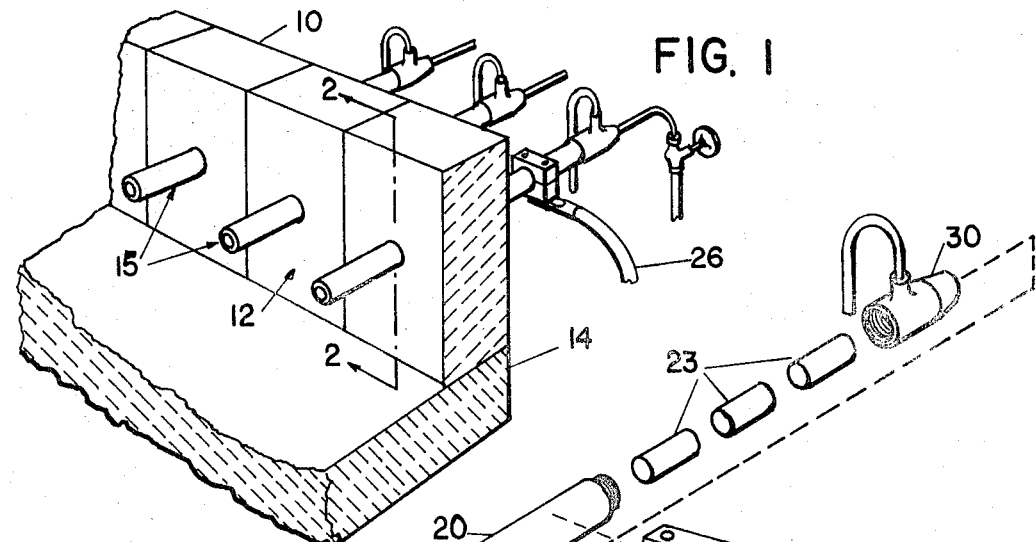
FIG. 1 is a fragmentary perspective view of a section of a furnace wall of typical construction for a glass-melting furnace showing electrodes therein embodying the present invention.
Figure 2:
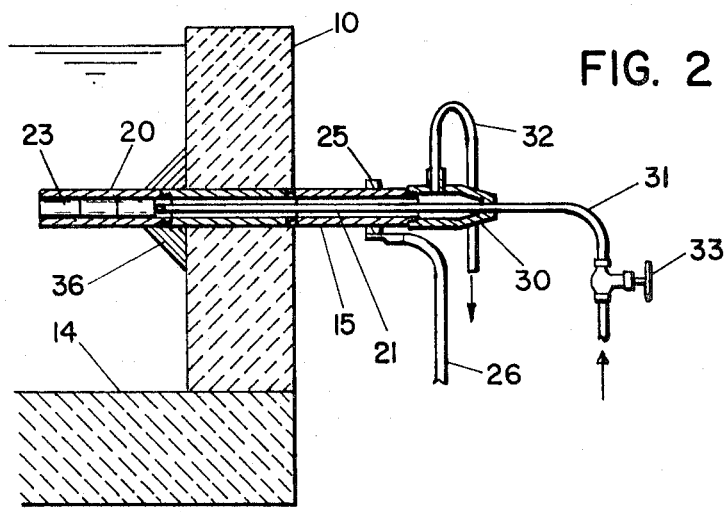
FIG. 2 is a fragmentary vertical section through the furnace wall and the electrode therein as viewed on line 2–2 of FIG. 1, but at a larger scale.

Referring now to the drawing, and particularly to FIG. 1 and 2, there is shown a portion of a typical furnace for melting glass. The sidewall 10 comprises a plurality of individual blocks 12 made of a suitable refractory material. Without limiting the present invention to any particular material, one common and well-known material is zirconium alumina which is cast into blocks used not only for the sidewall 10 but also for the bottom wall 14 of the furnace.

Sidewall 10 is pierced at intervals to receive electrodes 15. These are typically secondary heating means designed as a booster to obtain greater production from a furnace of a given size, but in some cases they supply all the heat for melting the glass. The primary heating means is commonly gas but is not shown in the drawing since the heating means constitute no part of the present invention.

Figure 3:
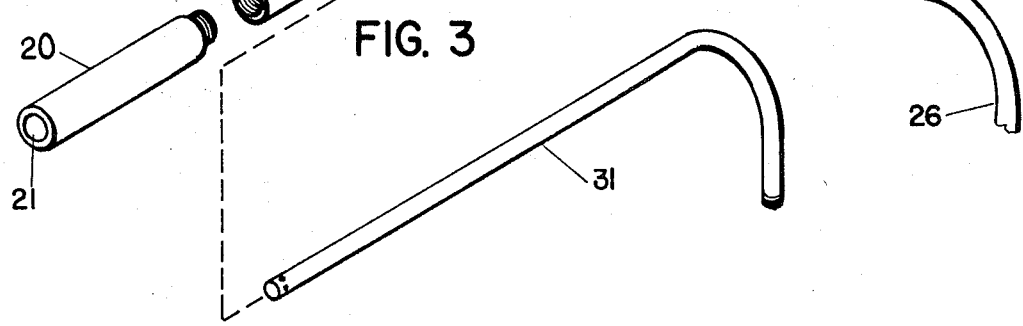
FIG. 3 is a still further enlarged exploded perspective of the electrode itself removed from the furnace wall.

An electrode 15 comprises an outer tube 20 which is preferably made in a plurality of sections as shown in FIG. 3, these sections being connected together in any suitable manner, as by screw-threaded joints. Tube 20 is hollow, having a bore 21 which extends the full length of the tube. In this bore is a core 23 which also comprises a plurality of sections. Typically these are solid plugs or rods which fit within bore 21 and are slidable relative to tube 20. These core sections are typically provided with flat end surfaces so that the sections have firm contact with each other; but the plugs may have screw threads or other means for connecting a series together in a way permitting them to be pulled back as a unit. The sections may be of any suitable and convenient length, for example in the range of 2 to 4 inches. Both the tube and the core are made of metal, molybdenum being a typical and preferred metal because of its high melting point and its long life in contact with the body of molten glass within the furnace.

Electrode 15 passes through the furnace wall as shown in FIG. 2. One end, referred to herein as the forward end, projects beyond the inner face of wall 10 and is immersed in the body of molten glass. The rear end of the electrode projects outwardly beyond the wall and at some point along its length there is applied to the electrode a split clamp 25 which can be bolted into firm contact with the electrode and to which an electrical conductor 26 is connected. The conductor is connected to a suitable source of current, not shown. It is typical in the industry to use three-phase alternating current, connecting an electrode to one phase.

On the outer end of electrode 15 is coupling 30 which has an opening to slidably receive pipe 31 through which coolant is introduced into the section of bore 21 that is not filled by core 23. Pipe 31 normally extends forwardly in the electrode to close proximity to core 23 in order to discharge coolant into bore 21 at the forward end thereof. Pipe 31 is of smaller diameter than bore 21 in order to provide an annular return passage around the pipe through which coolant can flow from the forward end of the bore to fitting 30 which it leaves through exhaust passage 32. Each pipe 31 is provided with a valve as indicated at 33 in order to control the rate of coolant flow. Typically, the coolant is water because of its cheapness and ready availability. However, any suitable liquid may be used for this purpose.

Flow of coolant internally of the electrode is maintained at a rate that cools the electrode in the zone rearwardly of core 23 and also lowers the maximum temperature reached by the surrounding refractory wall 10. This cooling effect becomes particularly advantageous when the coolant-filled section of the electrode extends inwardly of the face of wall 10 for a short distance, for example 6 inches, more or less, and into the body of glass within the furnace, as shown in FIG. 2.

With the electrode in this position, as shown, the electrode temperature at the forward end of the water-filled section is sufficiently reduced that there is formed around the electrode an irregular, more or less conical body 36 of glass below the melting point and which is sufficiently cooled to no longer be highly fluid or electrically conductive.

Depending on the actual decrease in temperature, this mass of glass 36 will vary in size and consistency, but it may be generally characterized as being in the semifluid to solid range and as surrounding the electrode and extending away from the electrode for a short distance, as indicated, to cover the inner face of a refractory block 12 for a short distance radially away from the electrode. The reduced temperature of the electrode where it pierces the wall reduces the thermal stresses in the refractory wall and thus contributes to its longevity. Also, the cooler glass at 36 is not effective as a solvent, as is molten glass, and consequently the life of the wall where covered by the cooler glass 36 is increased because of the slower rate of dissolution. Reduction in electrical conductivity of the wall assists in reducing its temperature in the vicinity of the electrode.

A further beneficial result is the fact that the cooler glass at 36 seals the electrode to the wall and thus prevents leakage of glass from the furnace around the electrode.

The tip of the electrode is the hottest portion since it is most remote from the zone cooled by the stream of coolant. The tip disintegrates by solution or reaction with the glass as mentioned above. When it is desired to extend the electrode further into the body of molten glass to replace the lost tip, the flow of coolant is discontinued long enough to melt the plug of glass at 36, after which the electrode can be advanced through wall 10 into the furnace as far as desired. The flow of coolant is then restored and as a consequence a new sealing plug at 36 is developed as a result of the cooling action being restored.

The sleeve is added onto by withdrawing pipe 31 and disconnecting coupling 32 and then adding another section to the sleeve 20. As often as required, additional sections of rod forming the solid core 23 can also be inserted into the sleeve when fitting 32 and pipe 31 are removed. The fitting and pipe are then reassembled on the electrode and the whole assembly is advanced into the furnace.

An added advantage of the present invention is the ability to regulate the length of the cooled portion of the electrode This can be done both by controlling the length of electrode projecting into the furnace but by controlling the number or length of plugs 23 in the tube of a given length. In either or both ways, the end of the cooled zone can be changed with respect to the inside face of sidewall 10. This enables the operator to regulate to some extent the resistance of the electrode and consequently the current flow by changing the location of the inner end of the water-filled and cooled section of the electrode.

From the foregoing it will be apparent to one of ordinary skill in the art that various changes in the shape, dimensions, and arrangement of the various parts comprising the electrode of the present invention may be made without departing from the spirit and scope of the present invention. Accordingly, it is to be understood that the specific embodiment disclosed is considered to be illustrative of, rather than limitative upon, the present invention.

I claim:
1. An electrode for a glass furnace comprising:
    a hollow outer tube transversely disposed within an orifice in a wall of said furnace, said wall having an inner face and an outer face, said tube having a forward end and a rearward end, the forward end of said tube projecting into said furnace beyond the inner face of said wall and the rearward end of said tube extending beyond the outer face of said wall;
    a core filling the hollow interior of the tube for a portion of the length thereof at the forward end of the electrode, said core being slidable in the tube; and
    means for circulating a liquid coolant within the tube behind the core.
2. An electrode according to claim 1 in which the tube comprises a plurality of sections connected together.
3. An electrode according to claim 1 in which the core comprises a plurality of lengths of solid rod.
4. An electrode according to claim 1 which also comprises means for detachably connecting an electrical conductor to the tube.
5. An electrode according to claim 1 in which the last mentioned means includes a detachable coupling mounted on the tube and providing connections for supply and exhaust of coolant.
6. An electrode according to claim 1 (in combination with a furnace wall) in which the electrode is slidably mounted within the orifice in said furnace wall.
7. An electrode according to claim 1 (in combination with a wall of a glass-melting furnace, the electrode projecting beyond the inner face of the wall into the furnace, with the portion containing coolant extending beyond said) wherein the rearward end of the core is beyond the inner face of the wall whereby the portion of the tube containing coolant extends beyond the inner face of the wall.
8. An electrode according to claim 1 (in combination with the sidewall of a glass-melting furnace through which wall the electrode projects with the coolant-filled portion extending into the furnace beyond the inner face of the wall) wherein the hollow outer tube projects into said furnace through an orifice in a sidewall thereof and the rearward end of the core disposed within said tube is beyond the inner face of said sidewall; and the circulating means circulating coolant at a rate to chill a body of glass around the electrode adjoining the inner face of the wall to a temperature below melting.